United States Patent [19]

Eschbach

[11] Patent Number: 5,268,774
[45] Date of Patent: Dec. 7, 1993

[54] HALFTONING WITH ENHANCED DYNAMIC RANGE AND EDGE ENHANCED ERROR DIFFUSION

[75] Inventor: Reiner Eschbach, Webster, N.Y.

[73] Assignee: Xerox Corporation, Stamford, Conn.

[21] Appl. No.: 800,811

[22] Filed: Nov. 27, 1991

[51] Int. Cl.$^5$ .............................................. H04N 1/40
[52] U.S. Cl. .................................... 358/466; 358/445
[58] Field of Search ............... 358/447, 445, 465, 466, 358/455, 456, 457, 443, 448; 382/56

[56] References Cited

U.S. PATENT DOCUMENTS

| | | | |
|---|---|---|---|
| 4,149,194 | 4/1979 | Holladay | 358/283 |
| 4,339,774 | 7/1982 | Temple | 358/283 |
| 4,654,721 | 3/1987 | Goertzel et al. | 358/283 |
| 4,924,322 | 5/1990 | Kurosawa et al. | 358/448 |
| 4,955,065 | 9/1990 | Ulichney | 382/50 |
| 4,975,786 | 12/1990 | Katayama et al. | 358/466 |
| 5,014,333 | 5/1991 | Miller et al. | 358/466 |
| 5,045,952 | 9/1991 | Eschbach | 358/447 |
| 5,055,942 | 10/1991 | Levien | 358/456 |
| 5,077,812 | 12/1991 | Kanno et al. | 358/466 |
| 5,150,429 | 9/1992 | Miller et al. | 358/466 |

OTHER PUBLICATIONS

An Adaptive Algorithm for Sptaial Greyscale, Floyd and Steinberg, Proceedings of the SID, 17/2, 75-77 (1976).

A Survey of Techniques for the Display of Continuous Tone Pictures on Bilevel Displays, Jarvis et al, Computer Graphics and Image Processing, vol. 5, pp.-13-40 (1976).

MECCA-A Multiple-Error Correction Computation Algorithm for Bi-Level Image Hardcopy Reproduction, Stucki, IBM Research RZ1060 (1981).

On the Error Diffusion Technique for Electronic Halftoning, Billotet-Hoffmann et al, Proceedings of the SID, vol. 24/3 pp. 253-258 (1983).

Digital Halftoning on the IBM 4250 Printer, Goertzel et al, IBM J Res Develop, vol. 31, No. 1, Jan. 1987, pp. 2-15.

Primary Examiner—Stephen Brinich
Attorney, Agent, or Firm—Mark Costello

[57] ABSTRACT

Gray pixel values, where the value of the pixel has one of a relatively large number of input levels, are directed through an error diffusion quantization process, for the conversion to one of a relatively small number of values. Each pixel of the gray level data is modified by a correspondingly weighted error correction term or terms from previously processed pixels, generating a modified pixel value. This modified pixel value is compared to a threshold value, the threshold value determined adaptively, based on 1) a dither pattern, having a dynamic range greater than 1, and 2) the value of the pixel to be thresholded, and optionally on its predetermined neighborhood, multiplied by a value representing an edge enhancement factor. The difference value between the modified pixel value and the output pixel value is distributed in accordance with a weighted distribution scheme to a set of neighboring unprocessed pixels, increasing or decreasing the gray values of such pixels.

46 Claims, 10 Drawing Sheets

|   | 1 | 2 | 3 | 4 |
|---|---|---|---|---|
| 1 | 144 | 16 | 48 | 176 |
| 2 | 240 | 112 | 80 | 208 |

$M_{n,\ell}$

FIG. 2A

|   | 1 | 2 | 3 | 4 |
|---|---|---|---|---|
| 1 | 576 | 64 | 192 | 704 |
| 2 | 960 | 448 | 320 | 832 |

$fM_{n,\ell}$

FIG. 2B

| PIXEL → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| SCANLINE 0 | 70 | 70 | 70 | 70 | 70 | 70 | 70 | 70 | 70 | 70 | 70 | 70 | 70 | 70 | 70 | 70 |
| 1 | 70 | 70 | 70 | 70 | 70 | 70 | 70 | 70 | 70 | 70 | 70 | 70 | 70 | 70 | 70 | 200 |
| 2 | 70 | 70 | 70 | 70 | 70 | 70 | 70 | 70 | 70 | 70 | 70 | 70 | 70 | 70 | 200 | 200 |
| 3 | 70 | 70 | 70 | 70 | 70 | 70 | 70 | 70 | 70 | 70 | 70 | 70 | 70 | 200 | 200 | 200 |
| 4 | 70 | 70 | 70 | 70 | 70 | 70 | 70 | 70 | 70 | 70 | 70 | 70 | 200 | 200 | 200 | 200 |
| 5 | 70 | 70 | 70 | 70 | 70 | 70 | 70 | 70 | 70 | 70 | 70 | 200 | 200 | 200 | 200 | 200 |
| 6 | 70 | 70 | 70 | 70 | 70 | 70 | 70 | 70 | 70 | 70 | 200 | 200 | 200 | 200 | 200 | 200 |
| 7 | 70 | 70 | 70 | 70 | 70 | 70 | 70 | 70 | 70 | 200 | 200 | 200 | 200 | 200 | 200 | 200 |
| 8 | 70 | 70 | 70 | 70 | 70 | 70 | 70 | 70 | 200 | 200 | 200 | 200 | 200 | 200 | 200 | 200 |
| 9 | 70 | 70 | 70 | 70 | 70 | 70 | 70 | 200 | 200 | 200 | 200 | 200 | 200 | 200 | 200 | 200 |
| 10 | 70 | 70 | 70 | 70 | 70 | 70 | 200 | 200 | 200 | 200 | 200 | 200 | 200 | 200 | 200 | 200 |
| 11 | 70 | 70 | 70 | 70 | 70 | 200 | 200 | 200 | 200 | 200 | 200 | 200 | 200 | 200 | 200 | 200 |
| 12 | 70 | 70 | 70 | 70 | 200 | 200 | 200 | 200 | 200 | 200 | 200 | 200 | 200 | 200 | 200 | 200 |
| 13 | 70 | 70 | 70 | 200 | 200 | 200 | 200 | 200 | 200 | 200 | 200 | 200 | 200 | 200 | 200 | 200 |
| 14 | 70 | 70 | 200 | 200 | 200 | 200 | 200 | 200 | 200 | 200 | 200 | 200 | 200 | 200 | 200 | 200 |
| 15 | 70 | 200 | 200 | 200 | 200 | 200 | 200 | 200 | 200 | 200 | 200 | 200 | 200 | 200 | 200 | 200 |

FIG. 5

| PIXEL → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| SCANLINE 0 | 0 | 255 | 0 | 255 | 0 | 0 | 0 | 0 | 255 | 0 | 0 | 0 | 0 | 0 | 0 | 255 |
| 1 | 0 | 0 | 0 | 0 | 255 | 0 | 255 | 0 | 0 | 255 | 255 | 255 | 255 | 0 | 255 | 255 |
| 2 | 0 | 255 | 0 | 0 | 0 | 0 | 0 | 0 | 0 | 0 | 255 | 255 | 0 | 0 | 255 | 0 |
| 3 | 0 | 0 | 255 | 0 | 255 | 255 | 255 | 0 | 0 | 0 | 0 | 0 | 0 | 255 | 0 | 255 |
| 4 | 0 | 255 | 0 | 0 | 0 | 0 | 0 | 0 | 255 | 0 | 0 | 255 | 255 | 255 | 0 | 255 |
| 5 | 255 | 0 | 0 | 255 | 0 | 255 | 0 | 255 | 0 | 0 | 0 | 0 | 0 | 255 | 255 | 0 |
| 6 | 0 | 0 | 0 | 0 | 0 | 0 | 0 | 0 | 0 | 255 | 255 | 255 | 255 | 255 | 255 | 255 |
| 7 | 0 | 255 | 255 | 255 | 0 | 255 | 255 | 0 | 255 | 0 | 0 | 0 | 0 | 0 | 0 | 255 |
| 8 | 0 | 0 | 0 | 255 | 255 | 0 | 0 | 0 | 0 | 255 | 255 | 255 | 255 | 255 | 255 | 255 |
| 9 | 0 | 255 | 0 | 0 | 0 | 0 | 0 | 255 | 0 | 0 | 0 | 0 | 0 | 0 | 255 | 255 |
| 10 | 0 | 0 | 0 | 255 | 0 | 255 | 255 | 0 | 0 | 0 | 255 | 255 | 255 | 255 | 0 | 255 |
| 11 | 255 | 255 | 0 | 0 | 0 | 0 | 0 | 255 | 255 | 255 | 255 | 0 | 255 | 255 | 255 | 255 |
| 12 | 0 | 0 | 255 | 255 | 255 | 255 | 0 | 0 | 0 | 255 | 255 | 255 | 0 | 0 | 0 | 0 |
| 13 | 0 | 255 | 0 | 0 | 0 | 0 | 255 | 0 | 0 | 255 | 255 | 255 | 255 | 255 | 255 | 255 |
| 14 | 0 | 0 | 255 | 0 | 0 | 0 | 0 | 0 | 0 | 0 | 255 | 0 | 0 | 0 | 0 | 255 |
| 15 | 255 | 255 | 0 | 255 | 0 | 255 | 255 | 255 | 255 | 255 | 255 | 255 | 255 | 255 | 255 | 0 |

| 116 | 108 | 100 | 124 | 132 | 172 | 164 | 156 |
|-----|-----|-----|-----|-----|-----|-----|-----|
| 60  | 52  | 68  | 84  | 220 | 228 | 236 | 188 |
| 28  | 20  | 44  | 76  | 212 | 252 | 244 | 180 |
| 4   | 12  | 36  | 92  | 140 | 204 | 196 | 148 |

FIG. 8A

8 TIMES {

| 116 | 108 | 100 | 124 | 132 | 172 | 164 | 156 |
|-----|-----|-----|-----|-----|-----|-----|-----|
| 60  | 52  | 68  | 84  | 220 | 228 | 236 | 188 |
| 28  | 20  | 44  | 76  | 212 | 252 | 244 | 180 |
| 4   | 12  | 36  | 92  | 140 | 204 | 196 | 148 |

FIG. 7B

| PIXEL → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| SCANLINE 0 | 0 | 255 | 0 | 0 | 0 | 0 | 0 | 0 | 0 | 255 | 0 | 0 | 0 | 0 | 0 | 0 |
| 1 | 255 | 0 | 255 | 0 | 0 | 0 | 0 | 255 | 255 | 0 | 0 | 255 | 0 | 0 | 0 | 255 |
| 2 | 255 | 0 | 0 | 255 | 0 | 0 | 0 | 0 | 255 | 255 | 0 | 0 | 0 | 0 | 0 | 255 |
| 3 | 255 | 0 | 0 | 0 | 255 | 0 | 255 | 0 | 255 | 0 | 0 | 0 | 0 | 0 | 255 | 255 |
| 4 | 0 | 0 | 0 | 0 | 255 | 255 | 0 | 0 | 0 | 0 | 0 | 0 | 0 | 255 | 255 | 255 |
| 5 | 0 | 0 | 0 | 255 | 255 | 0 | 255 | 0 | 0 | 0 | 0 | 255 | 255 | 255 | 255 | 255 |
| 6 | 0 | 0 | 0 | 0 | 255 | 0 | 255 | 255 | 0 | 0 | 0 | 255 | 255 | 255 | 255 | 0 |
| 7 | 255 | 255 | 0 | 0 | 255 | 0 | 0 | 0 | 0 | 0 | 255 | 255 | 255 | 255 | 0 | 255 |
| 8 | 255 | 0 | 255 | 0 | 0 | 0 | 0 | 0 | 255 | 0 | 0 | 0 | 255 | 0 | 0 | 255 |
| 9 | 255 | 0 | 0 | 255 | 0 | 0 | 0 | 255 | 0 | 0 | 255 | 255 | 0 | 255 | 255 | 255 |
| 10 | 0 | 255 | 0 | 0 | 0 | 0 | 0 | 0 | 255 | 0 | 0 | 255 | 255 | 255 | 255 | 0 |
| 11 | 255 | 0 | 255 | 0 | 255 | 0 | 255 | 0 | 0 | 0 | 0 | 255 | 255 | 255 | 255 | 255 |
| 12 | 0 | 0 | 0 | 255 | 0 | 255 | 255 | 0 | 255 | 0 | 0 | 255 | 255 | 255 | 0 | 255 |
| 13 | 0 | 0 | 0 | 0 | 255 | 0 | 0 | 255 | 0 | 0 | 255 | 255 | 255 | 255 | 255 | 255 |
| 14 | 0 | 255 | 255 | 0 | 0 | 255 | 0 | 0 | 0 | 255 | 0 | 0 | 255 | 0 | 255 | 255 |
| 15 | 0 | 0 | 0 | 0 | 255 | 0 | 0 | 0 | 0 | 255 | 255 | 255 | 255 | 255 | 255 | 0 |

| SCANLINE \ PIXEL → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 255 | 0 | 0 | 0 | 0 | 0 | 0 | 0 | 255 | 0 | 0 | 0 | 0 | 0 |
| 1 | 255 | 255 | 255 | 0 | 0 | 0 | 0 | 0 | 255 | 255 | 255 | 0 | 0 | 0 | 0 | 0 |
| 2 | 255 | 255 | 255 | 0 | 0 | 255 | 255 | 0 | 255 | 255 | 255 | 0 | 0 | 0 | 255 | 255 |
| 3 | 255 | 255 | 0 | 0 | 0 | 255 | 255 | 0 | 255 | 255 | 0 | 0 | 0 | 0 | 255 | 255 |
| 4 | 0 | 0 | 0 | 255 | 255 | 0 | 255 | 0 | 0 | 0 | 0 | 0 | 255 | 255 | 255 | 255 |
| 5 | 0 | 0 | 0 | 255 | 255 | 255 | 255 | 0 | 0 | 0 | 0 | 255 | 255 | 255 | 255 | 255 |
| 6 | 0 | 0 | 0 | 255 | 255 | 255 | 0 | 0 | 0 | 0 | 0 | 255 | 255 | 255 | 255 | 255 |
| 7 | 0 | 0 | 0 | 0 | 255 | 0 | 0 | 0 | 0 | 0 | 255 | 255 | 255 | 255 | 255 | 255 |
| 8 | 0 | 0 | 255 | 0 | 0 | 0 | 0 | 0 | 255 | 255 | 255 | 255 | 255 | 255 | 0 | 255 |
| 9 | 255 | 255 | 255 | 0 | 0 | 0 | 0 | 0 | 255 | 255 | 255 | 255 | 255 | 255 | 0 | 255 |
| 10 | 255 | 255 | 255 | 0 | 255 | 255 | 255 | 0 | 255 | 0 | 255 | 255 | 255 | 0 | 255 | 255 |
| 11 | 255 | 255 | 0 | 0 | 255 | 255 | 255 | 0 | 255 | 0 | 255 | 255 | 255 | 0 | 255 | 255 |
| 12 | 0 | 0 | 0 | 0 | 0 | 255 | 0 | 0 | 0 | 0 | 255 | 255 | 255 | 255 | 255 | 255 |
| 13 | 0 | 0 | 0 | 255 | 255 | 0 | 0 | 0 | 0 | 0 | 255 | 255 | 255 | 255 | 255 | 255 |
| 14 | 0 | 0 | 0 | 255 | 255 | 0 | 0 | 0 | 0 | 0 | 255 | 255 | 255 | 255 | 255 | 255 |
| 15 | 0 | 0 | 0 | 0 | 255 | 255 | 0 | 0 | 0 | 0 | 255 | 255 | 255 | 255 | 255 | 255 |

*FIG. 8B*

HALFTONING WITH ENHANCED DYNAMIC RANGE AND EDGE ENHANCED ERROR DIFFUSION

This invention relates to quantizing gray data using halftoning with an enhanced dynamic range and edge enhanced error diffusion.

BACKGROUND OF THE INVENTION

Image information, be it color or black and white, is commonly generated in a bitmap format where the bitmap comprises a plurality of gray level pixels, i.e. pixels that are defined by digital values, each value representing a gray level among a number of gray levels. Thus, in a 8 bit system, 256 levels of gray or 256 colors are present, where each level represents an increment of gray between black and white. In the case of color bitmaps, where three defining colors or separations each include 256 levels of information, there may be more than 16 million colors defined by a gray bitmap.

Usually, bitmaps in such a gray level format are unprintable by standard printers. Standard printers print in a limited number of levels, either a spot or a no spot in the binary case, or a limited number of levels associated with the spot, for example, four in the quaternary case. Accordingly, it is necessary to reduce the gray level image data to a limited number of levels so that it is printed. Besides gray level information derived by scanning, certain processing techniques such as those described, for example, in U.S. patent application Ser. No. 07/600,542, entitled, "Method for Making Image Conversions With Error Diffusion" by R. Eschbach, produce gray level pixel values which require conversion to a limited set of "legal" or output values.

One standard method of converting gray level pixel values to binary level pixel values is through the use of dithering or halftoning processes. In such arrangements, over a given area having a number of gray pixels therein, each pixel value of an array of gray level pixels within the area is compared to one of a set of preselected thresholds (the thresholds are stored as a dither matrix and the repetitive pattern generated by this matrix is considered a halftone cell) as taught, for example, in U.S. Pat. No. 4,149,194 to Holladay. The effect of such an arrangement is that, for an area where the image is gray, some of the thresholds within the dither matrix will be exceeded, i.e. the image value at that specific location is larger than the value stored in the dither matrix for that same location, while others are not. In the binary case, the pixels or cell elements for which the thresholds are exceeded might be printed as black, while the remaining elements are allowed to remain white, dependent on the actual physical quantity described by the data. The effect of the distribution of black and white over the halftone cell is integrated by the human eye as gray. Dithering or halftoning presents problems, however, in that the amount of gray within an original image is not maintained exactly over an area, because the finite number of elements inside each dither matrix—and therefore halftone cell—only allows the reproduction of a finite number of gray levels, i.e. equal or less than the number of elements in the cell plus one, or less. The error arising from the difference between the output pixel value and the actual gray level pixel value at any particular cell is simply thrown away. This results in a loss of image information. In particular, dithering introduces coarse quantization artifacts which are visible in the image areas where the scene has little variation. This is also known as "banding", and is caused by the limited number of output gray levels available. The "banding" artifacts generally increase with decreasing cell size, which is identical to a decrease in the number of levels that can be represented by the halftone cell.

Algorithms that convert gray images to binary or other number on level images while attempting to preserve local density exist, and include among them error diffusion, as taught, for example, in "An Adaptive Algorithm for Spatial Greyscale" by Floyd and Stienberg, Proceedings of the SID 17/2, 75–77 (1976) (hereinafter, "Floyd and Steinberg"). Another, more elaborate method would be the error diffusion technique of U.S. Pat. No. 5,045,952 to Eschbach, which serves to provide image dependent edge enhancement, assigned to the same assignee as the present invention. Additional modifications to the error diffusion algorithm as taught by Floyd and Steinberg have been proposed, e.g.: a different weighting matrix, as taught, for example, in "A Survey of Techniques for the Display of Continuous Tone Pictures on Bilevel Displays" by Jarvis et al., Computer Graphics and Image Processing, Vol. 5., pp. 13–40 (1976), and in "MECCA—A Multiple-Error Correction Computation Algorithm for Bi-Level Image Hardcopy Reproduction" by Stucki, IBM Res. Rep. RZ1060 (1981). Modifications of the error calculation and weight allocation have been taught, for example, in U.S. Pat. No. 4,924,322 to Kurosawa et. al., U.S. Pat. No. 4,339,774 to Temple, and U.S. Pat. No. 4,955,065, to Ulichney. Other error diffusion methods include U.S. patent application Ser. No. 07/600,542, entitled "Method of Making Image Conversions with Error Diffusion" to Eschbach; Ser. No. 07/672,987, entitled "Method of Error Diffusion with Application of Multiple Error Diffusion Matrices" by Eschbach; Ser. No. 07/755,380, entitled "Method for Quantization of Gray Level Pixel Data with Application of Under Compensated Error Diffusion", by Eschbach et al., all assigned to the same assignee as the present invention.

Error diffusion attempts to maintain gray by making the conversion from gray pixels to binary or other level pixels on a pixel-by-pixel basis. The procedure examines each pixel with respect to a threshold or set of thresholds, and the difference between the gray level pixel value and the outout value is forwarded to a selected group or set of neighboring pixels, in accordance with a weighting scheme.

Another modification to the method error diffusion was taught by Billotet-Hoffmann and Bryngdahl, Proceedings of the SID, Vol. 24/3, (1983), pp. 253–258 (hereinafter, Billotet-Hoffmann and Bryngdahl). A dither matrix is used as a threshold for error diffusion, to alleviate the problems of undesired patterns generally produced by the error diffusion algorithm. Notably, however, in Billotet-Hoffmann and Bryngdahl, the maximum dynamic range of the proposed threshold modification is set to $\alpha = 1$ (page 257 in the aforementioned reference).

A problem noted with the use of the standard error diffusion algorithms for printing applications is the production of large numbers of isolated black and/or white pixels which are non-printable by many types of printers. The algorithm taught by Billotet-Hoffmann and Bryngdahl does not improve the printability of the general error diffusion algorithm. A method to overcome the printability problem is taught by U.S. Pat. No.

4,654,721 to Goertzel, where a method is shown to convert a continuous tone image to a bilevel pixel image. The total error generated in one halftone cell is distributed to a predetermined number of adjacent halftone cells. In this way, printable images are generated, while the banding artifact is reduced, by alternating between fixed output dot patterns. Because of an inherent lack of partial dots in this process, evidenced as a loss in sharpness, edge detection and sharpening was included. See, also, "Digital Halftoning in the IBM 4250 Printer" by Goertzel et al. (Goertzel), IBM J. Res. Develop., Vol 31, No. 1, January, 1987. U.S. patent application Ser. No. 07/583,337 by Shiau, and Ser. No. 07/775,201 to Fan, teach the use of similar methods to reduce a continuous tone image to a multilevel pixel image with diffusion of error between adjacent cells.

SUMMARY OF THE INVENTION

In accordance with the invention, there is provided a quantizing method wherein a pixel defined by one of a large number of possible levels of optical density is redefined at one of a smaller number of levels of optical density, using an edge enhancing error diffusion algorithm with a threshold set in accordance with a dither matrix of large dynamic range.

In accordance with the invention, gray pixel values, where the value of the pixel has one of a relatively large number of input levels, are directed through an error diffusion quantization process, for the conversion to one of a relatively small number of values. Each pixel of the gray level data is modified by a correspondingly weighted error correction term or terms from previously processed pixels, generating a modified pixel value. This modified pixel value is compared to a threshold value, the threshold value determined adaptively, based on 1) a value given by the dither matrix, having a dynamic range greater than 1 (with the possible dynamic range of the input image being defined as 1), and 2) the value of the pixel to be thresholded, multiplied by a constant value representing an edge enhancement factor or by any of the edge enhancement schemes for error diffusion. The difference value between the modified pixel value and the output pixel value is considered the error and is distributed in accordance with a weighted distribution scheme to a set of neighboring unprocessed pixels, increasing or decreasing the gray values of such pixels. The term 'optical density' will be used hereinafter to describe the set of values comprising the image data, be it density, intensity, lightness or any other physical quantity described by image data representation.

In accordance with another aspect of the invention, there is provided a method of quantizing pixel values in an image formed by a plurality of pixels, each pixel representing an optical density of the image at a location within the image, and having an original optical density value associated therewith selected from one of a set of c original optical density values that has a number of members larger than a desired output set of d optical density values, the steps comprising: adding a sum of error terms derived from the quantization of at least one previous pixel and the original optical density value to derive a modified density value reflecting the added error; applying a threshold decision to each modified optical density value of each pixel in the modified original image, to produce a new optical density value that is a member of the desired output set, each member of the output set of d optical density values a legal output value, the threshold decision derived as a function of the input image, and a set of dither matrix threshold values having a dynamic range greater than the dynamic range of original optical density values; determining an error term that is a difference between the new output optical density value and the modified optical density value; applying a proportional amount of the error term to the original optical density value of each of a predetermined set of neighboring pixels, taking into account the fractional error allocations for said pixels generated at other pixels than the current one.

The present invention teaches a method that calculates error diffusion on a pixel-by-pixel basis, but simultaneously achieves printability by introducing a dither matrix into the process, but with a dynamic range clearly exceeding the dynamic range of the input, in contrast to the method taught by Billotet-Hoffmann and Bryngdahl. Additionally, use is made of the method described in U.S. Pat. No. 5,045,952 to Eschbach, to maintain image sharpness. There is a clear preference for a pixel-by-pixel processing enabled by this method, because it allows a better representation of image detail on the pixel level.

These and other aspects of the invention will become apparent from the following descriptions to illustrate a preferred embodiment of the invention read in conjunction with the accompanying drawings in which:

FIG. 2A shows an example standard dither matrix (dynamic range=1), while FIG. 2B shows the dither matrix modified to have an increased dynamic range, here 4;

FIGS. 5, 6, 7A, 7B, 8A and 8B are an illustrative example of the difference between Floyd and Steinberg, Billotet-Hoffmann and Bryngdahl, and the present invention.

Figure 1:
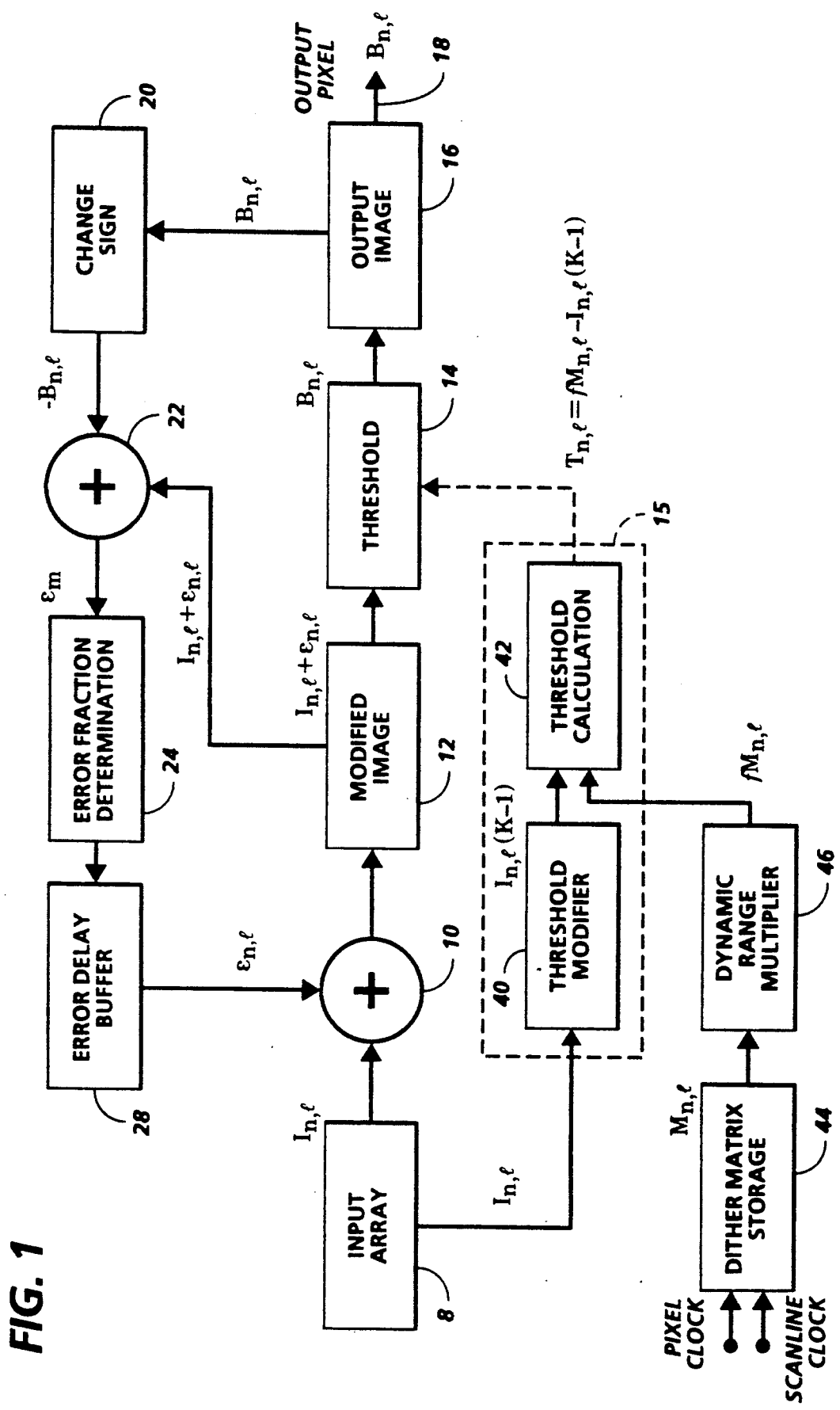
FIG. 1 is a block diagram of a basic system for carrying out the present invention.

Referring now to the drawings where the showings are for the purpose of describing an embodiment of the invention and not for limiting same, a basic system for carrying out the present invention is shown in FIG. 1. In the present case, gray level image data from image input 8 may be characterized as image data, each pixel of which is defined at a single level or optical density in a set of optical density levels, the number of members in the set of levels being larger than desired. Each pixel will be processed in the manner described hereinbelow, to redefine each pixel in terms of a new, smaller set of levels. Here, color data may be represented by a number of independent channels which are handled independently, or the color data might be represented as vector data in a predefined color space, e.g.: RGB, CIELab etc., being submitted to vector operations in the thresholding, error calculation and correction. One common case of this method includes the conversion of data from a relatively large set of gray level values to one of two legal or allowed bin values for printing in a binary printer. Another case of this is the conversion of data from a relatively large set of color data expressed as red, green and blue, or cyan, magenta, yellow and black, to one of five legal bin values for printing, as described in U.S. patent application Ser. No. 07/755,380, entitled "Method for Quantization of Gray Level Pixel Data with Application of Under Compensated Error Diffusion", by Eschbach et al.

An input image of the type to be processed as hereinafter described may be represented by a set of gray values (gray level pixels) arranged in an array of l lines, each line containing n gray values with depth b. Gray values are typically expressed as integers, with one example falling in the range from 0 to 255, although greater or lesser number of levels, as well as non-integer representations, are possible. An output image is considered to consist of pixels, each pixel corresponding to an output element that is printed by a digital printer or display. A dither matrix, as used herein, refers to a set of thresholds defined at locations corresponding to pixels over a given area of the image. A dither matrix is generally smaller than the total image and will be replicated in a predetermined scheme in order to cover an area of the image. A method for an efficient representation of variable angle halftone cells by a dither matrix and a corresponding replication scheme, is given in U.S. Pat. No. 4,149,194 to Holladay. The output of a process using a dither matrix is a set of pixel values, having a number of members less than the input set of values. Commonly, the set of output values is binary, either black or white, or a spot or no spot, although the values might be gray as described in U.S. patent application Ser. No. 07/583,337 by Shiau. The output of the dithering, or the set of pixels that are either black or white, together form a "dot". Single pixels, black or white, surrounded respectively by white or black pixels, are difficult to print with electrophotographic devices. For this reason, standard dither matrices for electrophotographic applications tend to cluster pixels together, with growth pattern that begins in a central area of the halftone cell and grows as more elements of the cell are black. Such a dot pattern is printable on electrophotographic devices. Dither matrices are sometimes also referred to as halftone screens.

With reference to FIG. 1, a stored array of input image data or pixels 8, which may be any source of image data, directs input image I into the system on a pixel-by-pixel basis, where n, l represents the position of a single pixel $I_{n,l}$ in the stream of image data. $I_{n,l}$ refers in this description to both the pixel that is positioned at n,l in the image stream, and the intensity of the pixel at position n,l. Each input pixel has a corresponding error term or value $\epsilon$ added to the input value $I_{n,l}$ at adder 10, where $\epsilon_{n,l}$ is a sum of error values of previous pixels to be directed to $I_{n,l}$, resulting in a modified image, represented by modified pixel values, temporarily stored at block 12. The modified image, the sum of the input value and the error value of previous pixels $(I_{n,l}+\epsilon_{n,l})$, is passed to threshold comparator 14. The modified image is compared to threshold value(s) $T_{n,l}$ to determine an appropriate output value $B_{n,l}$ for pixel $I_{n,l}$, such as, for example, in a binary output image, a spot or no spot. The application of variable thresholds is represented by the threshold source 15, which will be further explained hereinbelow. Once output pixel $B_{n,l}$ is determined and directed to output image storage 16 for eventual transfer to an output along line 18, the value of $B_{n,l}$ is subtracted from the modified image value $(I_{n,l}+\epsilon_{n,l})$ to generate an error level $\epsilon_m$ from pixel $I_{n,l}$. The subtraction operation is represented by the change sign block 20 and subsequent adder 22, with $\epsilon_m$ representing the difference between the modified image value $(I_{n,l}+\epsilon_{n,l})$ and the output value $B_{n,l}$ stored to error fraction determination block 24, where weighted portions of error $\epsilon_m$ are calculated, and will be used for updating the error delay buffer 28.

Determination of the threshold at threshold source 15 is made in accordance with the method of edge enhanced error diffusion taught in U.S. Pat. No. 5,045,952 to Eschback, incorporated herein by reference. That description provides a variable threshold level $T_{n,l}$ determined by first calculating a modifier based on the input value $I_{n,l}$ of each pixel and/or its predetermined neighborhood as described in U.S. Pat. No. 5,045,952, as represented in the threshold modifier block 40. For the simple case of determining the modifier based on the input pixel $I_{n,l}$ without a neighborhood, the modifier value $I_{n,l} \times (K-1)$ is then subtracted from the nominal threshold value $M_{n,l}$, at threshold calculation 42, to determine threshold level $T_{n,l}$ to be applied to threshold comparator block 20, with the enhancement factor K to be selected as hereinafter described. Alternatively, it is possible to accomplish an equivalent alteration of the threshold through the addition of the modifier value $I_{n,l}(K-1)$ to the modified image value $(I_n+E_{n-1})$ while maintaining the threshold value at level $M_{n,l}$.

In accordance with the invention, threshold value $M_{n,l}$ is determined in accordance with the position of pixel $I_{n,l}$ in the data stream, represented in FIG. 1 by the clocking of pixel and scan lines commonly generated in image processing systems, and a halftone screen or dither matrix M of threshold values. A set of values M stored in a dither matrix storage of memory 44 is directed on a pixel by pixel, and scan line by scan line basis to threshold calculation block 42, through the dynamic range multiplier 46, resulting in the threshold $T_{n,l}$ being a superposition of dither matrix and input image information. A changing pattern of threshold values is therefore superimposed over the edge enhancing error diffusion algorithm.

In accordance with another aspect of the invention, the threshold values of dither pattern M are selected having a dynamic range greater than the possible dynamic range of the input pixel values. Using a standard dither pattern with a dynamic range that is equal to or less than the range of the input values, such as perhaps that shown in FIG. 2A for the case of input values in the range from 0 to 255, each threshold level in the dither pattern is multiplied by a factor f, where f is much greater than 1 and increases with halftone cell or dot size. For example, for a $4 \times 2$ screen, f=4; for a $8 \times 4$ screen, f=8; and for a $10 \times 5$ screen, f=10. These values are only examples, and even for the particular screen sizes cited, other values of f may be provided. It will be understood that value of f is greater than 1, and increases with dot size. Of course, screens with such threshold values could be constructed, but users tend to have a large selection of screens in their possession. Accordingly, a simple multiplier arrangement, such as that provided by the combination of dither matrix storage 44 and dynamic range multiplier 46, is desirable. As previously noted, this value $fM_{n,l}$ is then used in the calculation of $T_{n,l}$. Alternatively, the original dither matrix (FIG. 2a) may be stored into the dither storage block 44 through a multiplier. In such a case, block 46 can be eliminated and the extended dynamic range dither matrix (FIG. 2b) can directly be addressed by the pixel and scan line clock. In any case, the value directed to threshold calculator operates as if the example dither matrix of FIG. 2B were being used.

Enhancement factor K may be held constant or may vary as a function of the input image content, local or global, within the continuous tone input image. In this particular application, K is selected to be about the same value as the dynamic range multiplier used for the dither matrix, with another embodiment using a K larger than the dynamic range multiplier of the dither matrix. As will become apparent, K is a factor in determining how closely image detail is preserved. Accordingly, a larger K tends to improve the apparent sharpness of the image.

Figure 4:
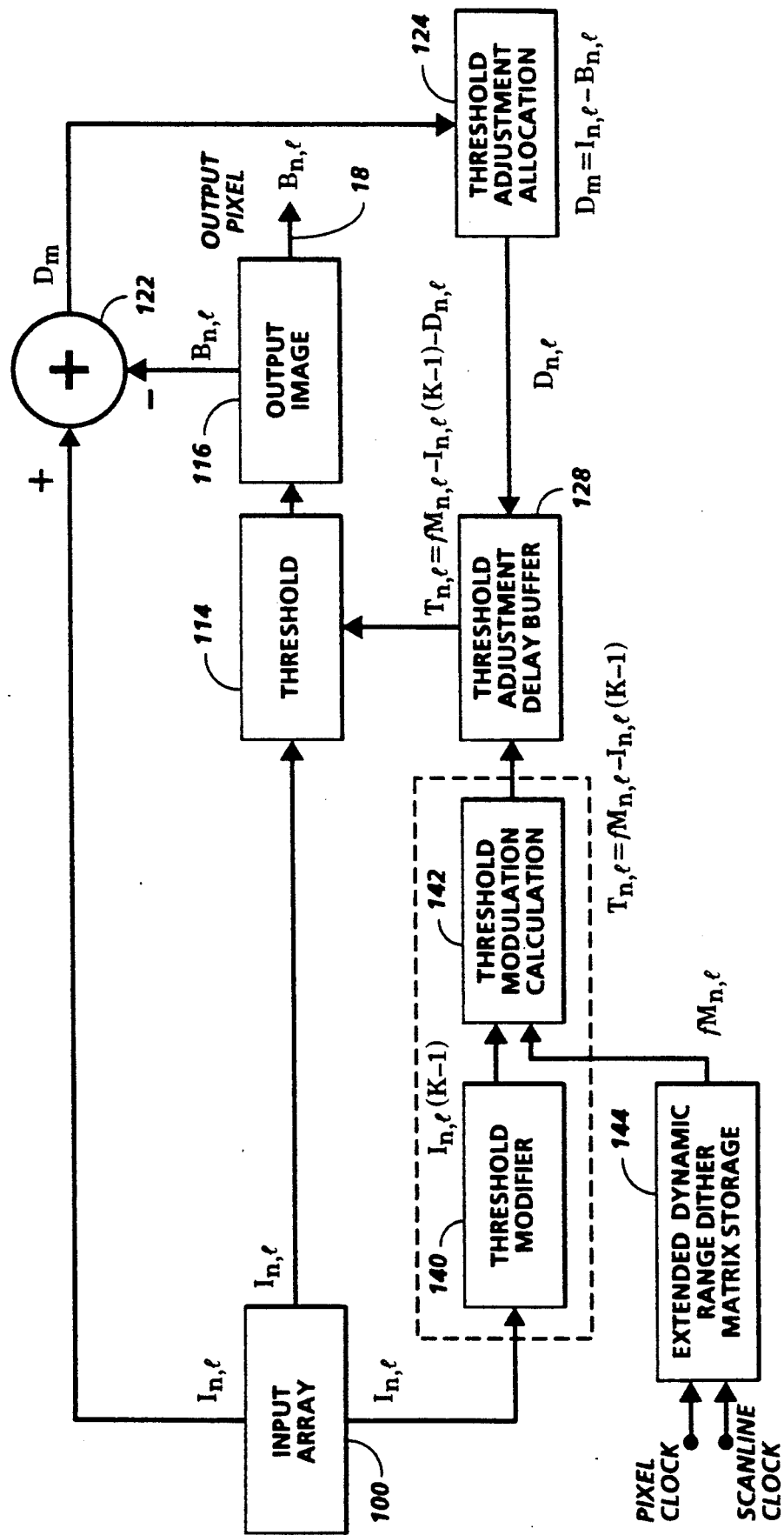
FIG. 4 is a different depiction of the basic system described in FIG. 1.

With reference to FIG. 4, there is provided a different representation of the present invention, where the error compensation is not done via a modified image, as shown in FIG. 1, but by using a continuously updated threshold adjustment delay buffer. Accordingly, a stored array of input image data or pixels 108, which may be any source of image data, directs input image I into the system on a pixel-by-pixel basis. The image, is passed to threshold comparator 114. The image is compared to threshold value(s) $T_{n,l}$ to determine an appropriate output value $B_{n,l}$ for pixel $I_{n,l}$, such as, for example, in a binary output image, a spot or no spot, which is stored to output buffer 116. The output value $B_{n,l}$ is changed in sign, and added at adder 122 to the original value of pixel $I_{n,l}$, so that a threshold adjustment allocation $D_m = I_{n,l} - B_{n,l}$. Threshold adjustment allocation $D_m$ represents an error in the thresholding process, and a weighted distribution thereof to a selected group of neighboring, unprocessed pixels. The original value of pixel $I_{n,l}$, plus optionally its neighborhood, is also used for the creation of a modifier value based on the input value $I_{n,l}$ of each pixel, as represented in the threshold modifier block 140. A modifier value $I_{n,l} \times (K-1)$ is then subtracted from the expanded dynamic range threshold value $fM_{n,l}$, at threshold calculation 142, to determine threshold level $T_{n,l}$ to be applied to threshold comparator block. The dither matrix values $fM_{n,l}$ are derived as previously described, and represented as extended dynamic range dither matrix storage 144. At threshold adjustment delay buffer 128, threshold level $T_{n,l}$ is added to the sum of threshold adjustment allocations $D_{n,l}$ directed thereto, for the creation of a new threshold $T_{n,l}$.

Figure 3A:
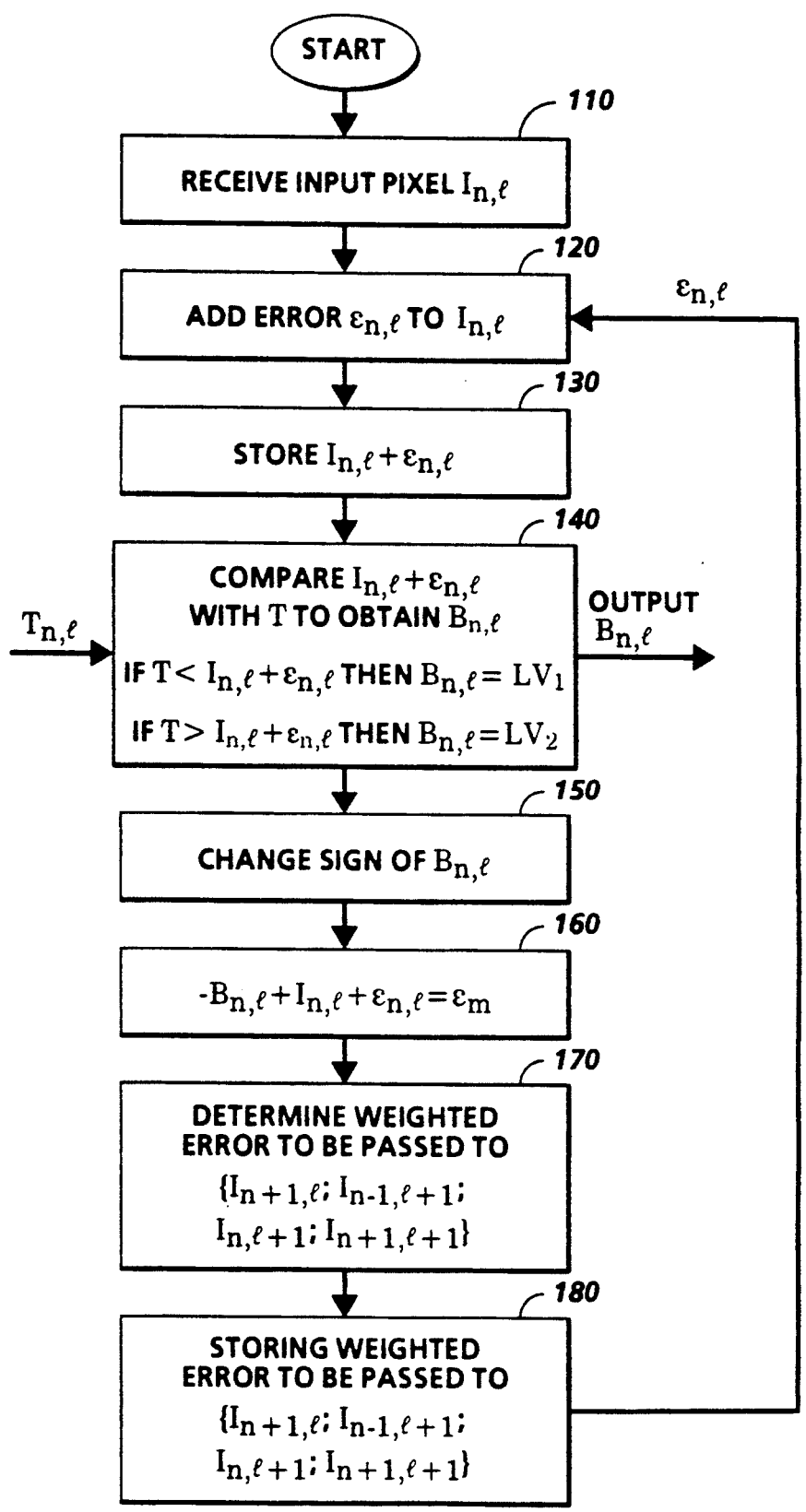
FIGS. 3A and 3B show a flow chart of the described embodiment.
Figure 3B:
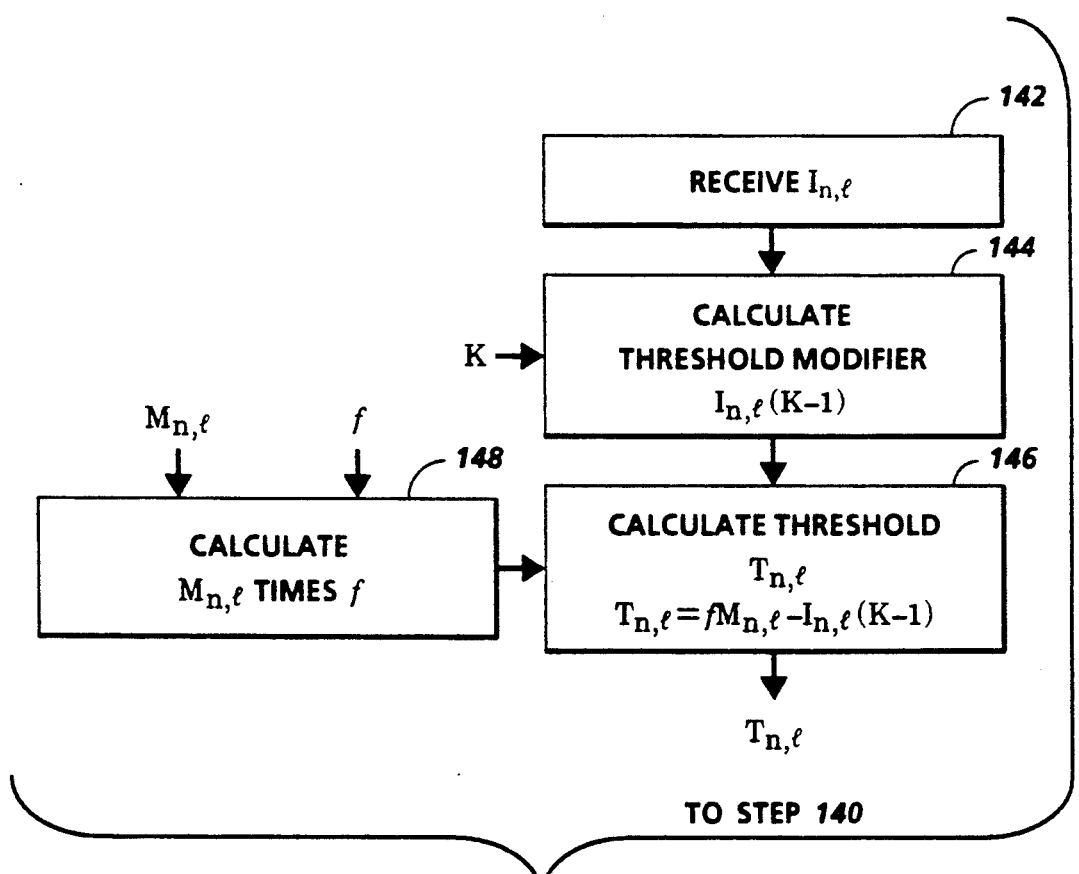

With reference now to FIG. 3, there is shown a flow chart demonstrating the steps of the inventive process of quantizing pixel values in an image formed by a plurality of pixels, each pixel representing an optical density of the image at a location within the image, and having an original optical density value associated therewith selected from one of a set of c original optical density values that has a number of members larger than a desired output set of d optical density values, where steps 110, 120, 130, 140, 150, 160, 170 and 180 are a standard error diffusion method of: 110) receiving an input pixel having a value $I_{n,l}$; 120) adding an error term $\epsilon_{n,l}$ from the error delay buffer to the pixel value $I_{n,l}$; 130) storing the value $I_{n,l} + \epsilon_{n,l}$ as a modified pixel value; 140) thresholding the modified pixel value with $T_{n,l}$ to obtain a new output value $B_{n,l}$ and directing $B_{n,l}$ to an output; 150) changing the sign of output value $B_{n,l}$; 160) adding $-B_{n,l}$ to $I_{n,l} + \epsilon_{n,l}$ to obtain quantizing error $\epsilon_m$; 170) determining the weighted error for each of the currently unprocessed pixels to which error in the quantization of pixel $I_{n,l}$ is to be directed, and 180) updating an error storage or buffer holding the errors that are added to the future pixels at step 120. Here, the unprocessed pixel set $\{I_{n+1,l}, I_{n-1,l+1}, I_{n,l+1}, I_{n+1,l+1}\}$ shown in block 170 and 180 is a common set for error diffusion, but other sets are also possible and are intended to be included in this description. In accordance with the invention, and shown in FIG. 3B, at step 140, an additional threshold determination is provided to determine threshold level $T_{n,l}$, including on substep 142, receiving $I_{n,l}$; substep 144, calculating a modifier based on the input value $I_{n,l}$ of each pixel and an enhancement factor K; substep 146, subtracting from threshold value $M_{n,l}$, the threshold modifier value $I_{n,l}(K-1)$ to determine threshold value $T_{n,l}$ to be applied to threshold the thresholding step 140. It can also be appreciated that alternatively subblock 142 receives the input optical density values of a set of pixels including $I_{n,l}$ and that the threshold modifier in subblock 144 is calculated dependent on this set. A simple example is to use a filtered version of the input image as input to subblock 144 as taught in U.S. Pat. No. 5,045,952. At step 148, assuming a standard dither matrix, each value of the dither matrix M is multiplied by a value f which is larger than 1, and increases in size with the number of elements of the dither matrix, so that the output of substep 148 reflects the desired expanded dynamic range of the dither matrix values.

With reference now to FIG. 5, there is provided an example of the inventive method. An array of input optical density values is shown in FIG. 6, where white=255 and black=0. The possible input dynamic range is assumed to be 0 to 255, i.e. 256 levels. For this example, consider the dynamic range to be defined as being 1. The image data represents a change over from an area of darker gray (pixel value=70) to lighter gray (pixel value=200) being a segment of a larger image. FIG. 6 shows the output optical density values generated by the method described by Floyd and Steinberg. The large number of isolated black or white pixels is apparent. See, for example, pixel #4 in scanline #3, where a value of 255 is surrounded by 0's, or pixel #12 in scanline #13, where a value of 0 is surrounded by 255's. FIG. 7B shows the method described by Billotet-Hoffmann and Bryngdahl, using a 32 element dither matrix shown in FIG. 7A (describing a 33 level halftone cell at 45 degrees inclination) with a maximum dynamic range factor of "1". The output optical density values are different from FIG. 6, but a large number of isolated pixels still remain. FIG. 8B shows the output optical density values of the inventive method, using, for this example, the 32 element dither matrix shown in FIG. 8A, a dynamic range factor of "8" and a threshold modifier factor of K=12. It is apparent from FIG. 8B that the image output structure has fewer individual black and white pixels.

The invention has been described with reference to a particular embodiment. Modifications and alterations will occur to others upon reading and understanding this specification. It should be noted that the use of the term "thresholding" throughout this invention is meant to encompass other ways of making a selection of the output optical density value. It should be noted that the present invention can be equivalently described by the characterization of FIG. 4 and it is intended that all such modifications, alterations and changes in notation are included insofar as they come within the scope of the appended claims or equivalents thereof.

I claim:

1. A method of quantizing pixel values in an original image formed by a plurality of pixels, each pixel representing an optical density of the image at a location within the image, and having an original optical density value associated therewith selected from one of a set of c original optical density values that has a number of members larger than a desired output set of d optical density values, and having a dynamic range associated therewith, the steps comprising:

for each pixel, adding a previously determined error term to the original optical density value thereof, to derive a modified pixel value;

determining for the pixel to be quantized, a threshold level that is a function of the original optical density of the pixel to be quantized, and a threshold value selected from a set of threshold values having a dynamic range that is greater than that of the original image;

applying the determined threshold level to each optical density value of each pixel in the image, to produce an output optical density value that is a member of the desired output set, each member of the output set of d optical density values a legal output value;

determining an error term that is a difference between the output optical density value and the modified optical density value of the modified pixel;

applying a predetermined portion of the determined error term to the original optical density value of each of a predetermined set of pixels neighboring each pixel.

2. The method as defined in claim 1, wherein the the set of threshold values describes a halftone cell.

3. The method as defined in claim 1, wherein the function determining the threshold level is the difference between a product of the original optical density value of the pixel to be quantized and a selected enhancement factor $K-1$, and a threshold value selected from the set of threshold values having a dynamic range that is greater than that of the original image.

4. The method as defined in claim 3, wherein the enhancement factor K is selected to be greater than or equal to the dynamic range of the set of threshold values.

5. The method as defined in claim 1, where the dynamic range of the set of threshold values is between 4 to 8 times the dynamic range of the original image.

6. An arrangement for quantizing pixel values in an image formed by a plurality of pixels, each pixel representing an optical density of the image at a location within the image, and having an original optical density value associated therewith selected from one of a set of c original optical density values that has a number of members larger than a desired output set of d optical density values, and having a dynamic range associated therewith defined as 1, the quantizing arrangement comprising:

means for inputting an image pixel to be quantized having an original optical density value;

means for adding an error term derived from the quantization of at least one previous pixel to the original optical density value to produce a modified image pixel;

means for determining for the pixel to be quantized, a threshold level, that is a function of the original optical density of the pixel to be quantized and a threshold value that is selected from a set of threshold values having a dynamic range that is greater than that of the original image;

means for thresholding the optical density value of each modified pixel in the image with the threshold level determined at said determining means, to produce a new optical density value that is a member of the desired output value set, each member of the output set of d new optical density values a legal output value which may be represented by an output device;

means for determining an error term that is a difference between the new optical density value and the modified optical density value;

means for storing a set of weighted error terms to be applied to each original optical density value in a predetermined set of pixels neighboring each pixel, each weighted error term a preselected portion of the error term.

7. The arrangement as defined in claim 6, wherein the set of threshold values describes a halftone cell.

8. The arrangement as defined in claim 6, wherein the function determining the threshold level is a difference between a product of the original optical density value of the pixel to be quantized and a selected enhancement factor $K-1$, and a threshold value selected from the set of threshold values having a dynamic range that is greater than that of the original image.

9. The arrangement as defined in claim 8, wherein the enhancement factor K is selected to be greater than or equal to the dynamic range of the set of threshold values.

10. The arrangement as defined in claim 6, where the dynamic range of the set of threshold values is between 4 to 8 times the dynamic range of the original image.

11. An arrangement for quantizing pixel values in an image formed by a plurality of pixels, each pixel representing an optical density of the image at a location within the image, and having an original optical density value associated therewith selected from one of a set of c original optical density values that has a number of members larger than a desired output set of d optical density values, and having a dynamic range associated therewith defined as 1, the quantizing arrangement comprising:

a source of image data including pixels having an original optical density value that is one of c original optical density values;

an adder for determining the sum of an error term derived from the quantization of at least one previous pixel and the original optical density value and which is stored in an error term memory;

threshold determining means, including a memory storing a set of threshold values, a multiplier for multiplying each threshold value in the set by a predetermined factor greater than 1, and a calculation means for determining an output threshold value that is a difference between the multiplied threshold value and a modifier value that is a function of the pixel to be quantized;

a comparator for comparing the sum to the output threshold value, and responsive to the comparison, producing an output value from the desired output set of d optical density values, each member of the desired output set of d optical density values a legal output value which may be represented by an output device;

an error term comparator for comparing the output value and the sum, and producing an error term that is the difference therebetween; and said error term memory storing error terms, a weighted portion thereof to be applied to each original optical density value in a predetermined set of pixels neighboring each pixel.

12. The arrangement as defined in claim 11, wherein the set of threshold values describes a halftone cell.

13. The arrangement as defined in claim 11, wherein the modifier value determining function is a product of the original optical density value of the pixel to be quantized and a selected enhancement factor $K-1$.

14. The arrangement as defined in claim 13, wherein the enhancement factor K is selected to be greater than or equal to the predetermined factor.

15. The arrangement as defined in claim 11, where the dynamic range of the set of threshold values is between 4 to 8 times the dynamic range of the original image.

16. An arrangement for quantizing pixel values in an image formed by a plurality of pixels, each pixel representing an optical density of the image at a location within the image, and having an original optical density value associated therewith selected from one of a set of c original optical density values that has a number of members larger than a desired output set of d optical density values, the quantizing arrangement comprising:
   a source of image data including pixels having an original optical density value that is one of c original optical density values, and defined for an input dynamic range having a selected value;
   a memory storing a set of threshold values;
   means for converting the set of threshold values to an adjusted set having a dynamic range larger than that of the input dynamic range and storing the adjusted set of threshold values for output value determination;
   an adder for determining the sum of an error term derived from the quantization of at least one previous pixel stored in an error term memory and the original optical density value;
   threshold determining means, using said adjusted threshold values, for determining a set of output threshold values that is a difference between the adjusted threshold value and a modifier value that is a function of the pixel to be quantized;
   a comparator for comparing the sum to the output threshold value, and responsive to the comparison, producing an output value from the desired output set of d optical density values, each member of the desired output set of d optical density values a legal output value which may be printed by an output device;
   an error term comparator for comparing the output value and the sum, and producing an error term that is the difference therebetween; and
   said error term memory storing error terms, a weighted portion thereof to be applied to each original optical density value in a predetermined set of pixels neighboring each pixel.

17. The arrangement as defined in claim 16, wherein the the set of threshold values describes a halftone cell.

18. The arrangement as defined in claim 16, wherein the modifier value determining function determining the threshold values is a product of the original optical density of the pixel to be quantized and a selected enhancement factor $K-1$.

19. The arrangement as defined in claim 18, wherein the enhancement factor K is selected to be greater than or equal to the dynamic range of the set of adjusted threshold values.

20. The arrangement as defined in claim 16, where the dynamic range of the adjusted set of threshold values is between 4 to 8 times the input dynamic range.

21. A method of quantizing pixel values in an image formed by a plurality of pixels, each pixel representing an optical density of the image at a location within the image, and having an original optical density value associated therewith selected from one of a set of c original optical density values that has a number of members larger than a desired output set of d optical density values, the steps comprising:
   adding a sum of error terms derived from the quantization of at least one previous pixel and the original optical density value to derive a modified density value reflecting the added error;
   applying a threshold level to each modified optical density value of each modified pixel to produce a new optical density value that is a member of the desired output set, each member of the output set of d optical density values a legal output value, the threshold level derived as a function of the input image, and a set of threshold values having a dynamic range greater than an input dynamic range of original optical density values;
   determining an error term that is a difference between the new optical density value and the modified optical density value;
   storing a predetermined portion of the error term to be added to original optical density value of each of a predetermined set of pixels neighboring each pixel.

22. The method as defined in claim 21, wherein the set of threshold values describes a halftone cell.

23. The method as defined in claim 21, wherein the function determining the threshold level is the difference between the product of the original optical density of the pixel to be quantized and a selected enhancement factor $K-1$, and the threshold value.

24. The method as defined in claim 23, wherein the enhancement factor K is selected to be greater than or equal to the dynamic range of the set of adjusted threshold values.

25. The method as defined in claim 21, where the dynamic range of the set of adjusted threshold values is between 4 to 8 times the input dynamic range.

26. An arrangement for quantizing pixel values in an image formed by a plurality of pixels, each pixel representing an optical density of the image at a location within the image, and having an original optical density value associated therewith selected from one of a set of c original optical density values that has a number of members larger than a desired output set of d optical density values, the quantizing arrangement comprising:
   a source of image data including pixels having a value, in image order, that is one of c input values;
   an adder for determining a sum of a first pixel value and an error term stored in an error term memory and derived from the quantization of at least one previous pixel;
   reference value determining means, including a threshold memory storing a set of threshold values, a multiplier for multiplying each threshold value in the set by a predetermined factor greater than 1, and a calculator determining an output reference value that is a difference between the multiplied threshold value and a modifier value that is a function of the pixel to be quantized;
   a comparator for comparing the sum to at least the determined reference value, and producing therefrom an output value from the set of d output values, each member of the desired output set of d output values a legal value which may be printed by an output device;

an error term comparator for comparing the output value and the sum, and producing an error term that is the difference therebetween;

said error term memory, storing at least one error term to be applied to a subsequent pixel.

27. The arrangement as defined in claim 26, wherein the set of threshold values describes a halftone cell.

28. The arrangement as defined in claim 26, wherein the modifier value is a product of the original optical density of the pixel to be quantized and a selected enhancement factor $K-1$.

29. The arrangement as defined in claim 28, wherein the enhancement factor K is selected to be greater than or equal to the predetermined factor for multiplying the set of threshold values.

30. The arrangement as defined in claim 26, where the predetermined factor for multiplying the set of threshold values is between 4 to 8 times a dynamic range of the image before quantization.

31. An arrangement for quantizing pixel values in an image formed by a plurality of pixels, each pixel representing an optical density of the image at a location within the image, and having an original optical density value associated therewith selected from one of a set of c original optical density values that has a number of members larger than a desired output set of d optical density values, the quantizing arrangement comprising:
  a source of image data including pixels having a value, in image order, that is one of c input values, and defined for an input dynamic range having a selected value;
  an adder for determining a sum of a first pixel value and an error term stored in an error term memory and derived from the quantization of at least one previous pixel;
  means for storing a set of threshold values;
  means for converting the set of threshold values to an adjusted set having a dynamic range larger than that of the input dynamic range and storing the adjusted set of threshold values for output value determination;
  determining means, using said adjusted threshold value, for determining a set of reference values that are a difference between the adjusted threshold value and a modifier value that is a function of the pixel to be quantized;
  a comparator for comparing the sum to determine reference value, and producing therefrom an output value from the set of d output values, each member of the desired output set of d output values a legal value which may be printed by an output device;
  an error term comparator for comparing the output value and the sum, and producing an error term that is the difference therebetween;
  said error term memory, storing at least one error term to be applied to a subsequent pixel.

32. The arrangement as defined in claim 31, wherein the set of threshold values describes a halftone cell.

33. The arrangement as defined in claim 31, wherein the function determining the modifier value is the product of the original optical density value of the pixel to be quantized and an enhancement factor $K-1$.

34. The arrangement as defined in claim 33, wherein the enhancement factor K is selected to be greater than or equal to the dynamic range of the set of adjusted threshold values.

35. The arrangement as defined in claim 31, where the dynamic range of the set of adjusted threshold values is between 4 to 8 times the dynamic range of the original image.

36. A method of quantizing pixel values in an image formed by a plurality of pixels in an ordered arrangement, each pixel representing an optical density of the image at a location within the image, and having an original optical density value associated therewith selected from one of a set of c original optical density values that has a number of members larger than a desired output set of d optical density values, the steps comprising:
  adding to each pixel value in an image an error term from the quantization of a pixel previously processed, to produce a modified pixel value;
  determining for each pixel to be quantized, a threshold level that is a function of the optical density of the pixel to be quantized, and of a threshold value that is selected from a set of threshold values having a dynamic range that is greater than that of the original image;
  applying the determined threshold level to each modified pixel value of each pixel in the image, to produce a new value that is a member of the output set, each member of the output set of d values a legal output value;
  determining an error term that is a difference between the new value and the modified pixel value;
  deriving a set of weighted error terms to be applied to each pixel value in the neighboring set, each weighted error term a preselected portion of the error term, and storing the set of weighted error terms to be subsequently added to the pixel values in the neighboring set prior to applying the threshold level thereto.

37. The method as defined in claim 36, wherein the set of threshold values describes a halftone cell.

38. The method as defined in claim 37, wherein the function determining the threshold level is the difference between the product of the original optical density of the pixel to be quantized and a selected enhancement factor $K-1$, and the threshold value selected from the set of threshold values having a dynamic range that is greater than that of the original image.

39. The method as defined in claim 38, wherein the enhancement factor K is selected to be greater than or equal to the dynamic range of the set of threshold values.

40. The method as defined in claim 37, where the dynamic range of the set of threshold values is between 4 to 8 times the dynamic range of the original image.

41. A method of quantizing pixel values in an original image formed by a plurality of pixels, each pixel representing an optical density of the image at a location within the image, and having an original optical density value associated therewith selected from one of a set of c original optical density values that has a number of members larger than a desired output set of d optical density values, and having a dynamic range associated therewith, the steps comprising:
  for each pixel, adding a previously determined error term to the original optical density value thereof, to derive a modified pixel value;
  determining for the pixel to be quantized, a threshold level that is a function of the original optical density of the pixel and its predetermined neighborhood to be quantized, and a threshold value selected from a set of threshold values having a dynamic range that is greater than that of the original image;

applying the determined threshold level to each optical density value of each pixel in the image, to produce an output optical density value that is a member of the desired output set, each member of the output set of d optical density values a legal output value;

determining an error term that is a difference between the output optical density value and the modified optical density value of the pixel;

applying a proportional amount of the determined error term to the original optical density value of each of a predetermined set of pixels neighboring each pixel.

42. The method as defined in claim 41, wherein the set of threshold values describes a halftone cell.

43. The method as defined in claim 41, wherein the function determining the threshold level is the difference between a product of the original optical density value of the pixel to be quantized and a selected enhancement factor $K-1$, and the threshold value selected from the set of threshold values having a dynamic range that is greater than that of the original image.

44. The method as defined in claim 43, wherein the enhancement factor K is selected to be greater than or equal to the dynamic range the set of threshold values.

45. The method as defined in claim 41, where the dynamic range of the set of threshold values is between 4 to 8 times the dynamic range of the original image.

46. The method as defined in claim 41, where the neighborhood only includes the pixel to be quantized.

* * * * *